(12) United States Patent
Liu

(10) Patent No.: US 11,561,637 B2
(45) Date of Patent: Jan. 24, 2023

(54) METHOD AND DEVICE OF DRAWING HANDWRITING TRACK, ELECTRONIC APPARATUS, MEDIUM, AND PROGRAM PRODUCT

(71) Applicant: BOE TECHNOLOGY GROUP CO., LTD., Beijing (CN)

(72) Inventor: Pengyu Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 25 days.

(21) Appl. No.: 17/271,548

(22) PCT Filed: May 20, 2020

(86) PCT No.: PCT/CN2020/091321
§ 371 (c)(1),
(2) Date: Feb. 25, 2021

(87) PCT Pub. No.: WO2021/232294
PCT Pub. Date: Nov. 25, 2021

(65) Prior Publication Data
US 2022/0121307 A1  Apr. 21, 2022

(51) Int. Cl.
*G06F 3/041* (2006.01)
*G06F 3/0354* (2013.01)
*G06T 11/20* (2006.01)

(52) U.S. Cl.
CPC ........ *G06F 3/0414* (2013.01); *G06F 3/03545* (2013.01); *G06F 3/03547* (2013.01); *G06T 11/203* (2013.01)

(58) Field of Classification Search
CPC .............. G06F 3/0414; G06F 3/03545; G06F 3/03547; G06F 3/0488; G06F 3/04883; G06T 11/203
See application file for complete search history.

(56) References Cited

U.S. PATENT DOCUMENTS

| 10,013,503 B2 | 7/2018 | Liang et al. |
| 2008/0129756 A1* | 6/2008 | Iwano ........................ B60R 1/00 348/148 |

(Continued)

FOREIGN PATENT DOCUMENTS

| CN | 102937849 A | 2/2013 |
| CN | 103164158 A | 6/2013 |

(Continued)

*Primary Examiner* — Patrick N Edouard
*Assistant Examiner* — Joseph P Fox
(74) *Attorney, Agent, or Firm* — Kinney & Lange, P.A.

(57) ABSTRACT

A method of drawing a handwriting track for an electronic apparatus includes: creating a buffer canvas and a display canvas; acquiring parameter information of a plurality of touch track points; and performing drawing processing on each touch track point of the plurality of touch track points. The performing drawing processing on each touch track point includes: determining a position parameter, size and transparency of each of a plurality of track points to be displayed respectively, based on the touch position parameter and sensing parameter of the each touch track point and those of a predetermined number of touch track points of the plurality of touch track points; and drawing a handwriting track on the buffer canvas based on the position parameter, size and transparency of each of the plurality of track points, and drawing on the display canvas the handwriting track drawn on the buffer canvas.

15 Claims, 8 Drawing Sheets

(56) References Cited

U.S. PATENT DOCUMENTS

2014/0240322 A1\* 8/2014 Brumer ................ G06T 5/002
  345/442
2016/0328486 A1 11/2016 Liang et al.

FOREIGN PATENT DOCUMENTS

| CN | 103336816 | A | 10/2013 | | |
|---|---|---|---|---|---|
| CN | 106951166 | A | 7/2017 | | |
| CN | 104517102 | B | 9/2017 | | |
| CN | 107193952 | A | 9/2017 | | |
| CN | 108597006 | A | 9/2018 | | |
| CN | 108628532 | A | 10/2018 | | |
| CN | 109035089 | A | 12/2018 | | |
| CN | 108597006 | B | 4/2019 | | |
| WO | WO-2015075933 | A1 \* | 5/2015 | ........... | G06F 3/0346 |

\* cited by examiner

METHOD AND DEVICE OF DRAWING HANDWRITING TRACK, ELECTRONIC APPARATUS, MEDIUM, AND PROGRAM PRODUCT

CROSS-REFERENCE TO RELATED APPLICATION

This application is a Section 371 National Stage Application of International Application No. PCT/CN2020/091321, filed on May 20, 2020, entitled "METHOD AND DEVICE OF DRAWING HANDWRITING TRACK, ELECTRONIC APPARATUS, MEDIUM, AND PROGRAM PRODUCT", which is incorporated herein by reference in their entirety.

TECHNICAL FIELD

The present disclosure relates to a field of computer technology, and in particular to a method and device of drawing a handwriting track for an electronic apparatus, an electronic apparatus, a non-transitory medium, and a program product.

BACKGROUND

Under normal circumstances, handwriting drawing solutions for an electronic apparatus may show different thicknesses of handwriting according to user's touch operations, but may not efficiently and conveniently show different depths of handwriting. A handwriting track drawn is different from user's actual handwriting, or the operation is not efficient and convenient. In addition, in the handwriting drawing, a system of the electronic apparatus draws a next handwriting track after a previous handwriting track has been drawn, and a drawing speed is relatively slow.

SUMMARY

Embodiments of the present disclosure provide a method and device of drawing a handwriting track for an electronic apparatus, an electronic apparatus, a non-transitory medium, and a program product.

According to one aspect of the embodiments of the present disclosure, there is provided a method of drawing a handwriting track for an electronic apparatus, including: creating a buffer canvas and a display canvas at the electronic apparatus; acquiring parameter information of a plurality of touch track points, wherein the parameter information contains a touch time, touch position parameter and sensing parameter; and performing drawing processing on each touch track point of the plurality of touch track points. The performing drawing processing on each touch track point includes: determining a position parameter, a size and a transparency of each of a plurality of track points to be displayed respectively, based on the touch position parameter and sensing parameter of the each touch track point and those of a predetermined number of touch track points of the plurality of touch track points, wherein a touch time of the predetermined number of touch track points is later than that of the each touch track point, and the plurality of track points form a handwriting track corresponding to the each touch track point; and drawing the handwriting track on the buffer canvas based on the respective position parameters, sizes and the transparency of the plurality of track points, and drawing on the display canvas the handwriting track drawn on the buffer canvas, so as to display the display canvas by the electronic apparatus.

For example, the drawing on the display canvas the handwriting track drawn on the buffer canvas includes: acquiring a first selection box and a second selection box; taking an area of the buffer canvas containing the handwriting track as a current selected content of the first selection box; determining whether a previous selected content of the second selection box is empty or not; taking the current selected content of the first selection box as a current selected content of the second selection box, in response to determining that the previous selected content of the second selection box is empty; and drawing the previous selected content of the second selection box on the display canvas, in response to determining that the previous selected content of the second selection box is not empty.

For example, the drawing on the display canvas the handwriting track drawn on the buffer canvas further includes, subsequent to drawing the previous selected content of the second selection box on the display canvas: determining whether there is an overlapping area between the previous selected content of the second selection box and the current selected content of the first selection box; setting a transparency of the overlapping area in the current selected content of the first selection box to a predetermined value, in response to determining that there is an overlapping area; and taking the current selected content of the first selection box with the transparency set, as the current selected content of the second selection box.

For example, the drawing on the display canvas the handwriting track drawn on the buffer canvas further includes: taking the current selected content of the first selection box as the current selected content of the second selection box, in response to determining that there is no overlapping area.

For example, the buffer canvas and the display canvas have same height and same width. The previous selected content of the second selection box contains a selected picture corresponding to the previous selected content, and a position parameter of the selected picture in the buffer canvas. The drawing the previous selected content of the second selection box on the display canvas includes drawing the selected picture on the display canvas based on the position parameter of the selected picture in the buffer canvas.

For example, the taking an area of the buffer canvas containing the handwriting track as a current selected content of the first selection box includes: taking the area containing the handwriting track as the current selected content of the first selection box subsequent to determining that the previous selected content of the first selection box has been taken as the previous selected content of the second selection box.

For example, the determining a position parameter, a size and a transparency of each of a plurality of track points to be displayed respectively, based on the touch position parameter and sensing parameter of the each touch track point and those of a predetermined number of touch track points of the plurality of touch track points includes: performing fitting to obtain a curve based on the touch position parameter and sensing parameter of the touch track point and those of the predetermined number of touch track points, and determining the position parameter and sensing parameter of each of a plurality of points on the curve; taking the position parameter of each of the plurality of points respectively as the position parameter of each of the plurality of track points; and determining the size and the transparency of each of the plurality of track points respectively based on the sensing parameter of each of the plurality of points.

For example, the performing fitting to obtain a curve and determining the position parameter and sensing parameter of each of a plurality of points on the curve includes: determining a position parameter and a sensing parameter of each of a start point, a control point and an end point based on the touch position parameter and sensing parameter of the each touch track point and those of next two touch track points of the plurality of touch track points, wherein the touch time of the next two touch track points is later than that of the each touch track point; determining a second-order Bezier curve equation based on the position parameter of each of the start point, the control point and the end point; determining the position parameter of each of the plurality of points based on the second-order Bezier curve equation; and determining the sensing parameter of each of the plurality of points based on the second-order Bezier curve equation and the sensing parameter of each of the start point, the control point and the end point.

For example, the touch position parameter of the touch track point contains a position parameter of a center point of the touch track point, and the sensing parameter of the touch track point contains a sensing parameter of the center point of the touch track point. The determining the position parameter and sensing parameter of each of a start point, a control point and an end point based on the touch position parameter and sensing parameter of the each touch track point and those of next two touch track points of the plurality of touch track points includes: calculating a position parameter and a sensing parameter of a midpoint of a connecting line between the touch track point and a next first touch track point of the next two touch track points based on the touch position parameter and sensing parameter of the touch track point and those of the next first touch track point, as the position parameter and the sensing parameter of the start point; taking the touch position parameter and the sensing parameter of a center point of the next first touch track point as the position parameter and the sensing parameter of the control point; and calculating a position parameter and a sensing parameter of a midpoint of a connecting line between the next first touch track point and a next second touch track point of the next two touch track points based on the touch position parameter and the sensing parameter of the next first touch track point and those of the next second touch track point, as the position parameter and the sensing parameter of the end point.

For example, the determining a size and a transparency of each of the plurality of track points based on the sensing parameter of each of the plurality of points includes: presetting a first mapping table and a second mapping table; determining, for each of the plurality of points, a size corresponding to the sensing parameter of the point as the size of one of the plurality of track points, based on the first mapping table; and determining a transparency corresponding to the sensing parameter of the point as the transparency of the track point, based on the second mapping table.

For example, the sensing parameter of the touch track point contains at least one of a pressure sensing value of the touch track point, a touch sliding speed of the touch track point, and a touch area of the touch track point.

For example, when each of the plurality of track points is a circle, the size of the track point is a radius of the track point.

For example, the method further includes: subsequent to acquiring the parameter information of the touch track point, storing the parameter information of the touch track point in a buffer area. The determining the position parameter, the size and the transparency of each of a plurality of track points to be displayed respectively, based on the touch position parameter and the sensing parameter of the each touch track point and those of a predetermined number of touch track points of the plurality of touch track points includes: determining the position parameter, the size and the transparency of each of the plurality of track points based on the touch position parameter and the sensing parameter of the touch track point and those of the predetermined number of touch track points stored in the buffer area. The method further includes: deleting the parameter information of the touch track point from the buffer area subsequent to determining the position parameter, the size and the transparency of each of the plurality of track points to be displayed.

According to another aspect of the embodiments of the present disclosure, there is provided a device of drawing a handwriting track for an electronic apparatus, including: a creation module configured to create a buffer canvas and a display canvas at the electronic apparatus; an acquisition module configured to acquire parameter information of a plurality of touch track points; and a drawing module configured to perform drawing processing on each touch track point of the plurality of touch track points. The drawing module includes: a determining sub-module configured to determine a position parameter, the size and the transparency of each of a plurality of track points to be displayed respectively, based on the parameter information of the each touch track point and that of a predetermined number of next touch track points of the plurality of touch track points, wherein the plurality of track points form a handwriting track for the each touch track point; and a buffer drawing sub-module configured to draw the handwriting track on the buffer canvas based on the position parameter, the size and the transparency of each of the plurality of track points, and draw on the display canvas the handwriting track drawn on the buffer canvas, so as to display the display canvas by the electronic apparatus.

According to another aspect of the present disclosure, there is provided an electronic apparatus, including: a display unit configured to receive a touch event; at least one processor configured to perform the method according to the embodiments of the present disclosure in response to the touch event, so that the display unit displays the display canvas.

According to another aspect of the present disclosure, there is provided an electronic apparatus, including: a memory configured to store instructions; and at least one processor configured to execute the instructions stored in the memory, so as to perform the method according to the embodiments of the present disclosure.

According to another aspect of the present disclosure, there is provided a non-transitory computer-readable storage medium having computer instructions stored thereon, wherein the computer instructions, when executed by a processor, cause the processor to perform the method according to the embodiments of the present disclosure.

According to another aspect of the present disclosure, there is provided a computer program product containing computer instructions, wherein the computer instructions, when executed by a processor, cause the processor to perform the method according to the embodiments of the present disclosure.

BRIEF DESCRIPTION OF THE DRAWINGS

In order to more clearly illustrate the technical solutions in the embodiments of the present disclosure or the related art, the drawings required in the description of the embodiments are briefly introduced below. Obviously, the drawings in the following description are some embodiments of the present disclosure. For those ordinary skilled in the art, other drawings may be obtained from these drawings without carrying out any inventive effort.

DETAILED DESCRIPTION OF EMBODIMENTS

In order to make the objectives, technical solutions and advantages of the present disclosure more clear, the technical solutions of the present disclosure are clearly and completely described below with reference to the drawings of the embodiments of the present disclosure. Obviously, the described embodiments are only a part but not all of the embodiments of the present disclosure. Based on the embodiments of the present disclosure, all other embodiments obtained by persons of ordinary skill in the art without carrying out inventive effort fall within the protection scope of the present disclosure. It should be noted that throughout the drawings, the same elements are represented by the same or similar reference signs. In the following description, some specific embodiments are only used for descriptive purposes, and should not be construed as limiting the present disclosure. They are merely examples of the embodiments of the present disclosure. In addition, in the following description, descriptions of well-known structures and technologies are omitted to avoid unnecessarily obscuring the concepts of the present disclosure.

The terms used herein are for the purpose of describing specific embodiments only and are not intended to limit the present disclosure. The terms "comprising", "including", etc. used herein indicate the presence of the feature, step, operation and/or part, but do not exclude the presence or addition of one or more other features, steps, operations or parts.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or too rigid way.

In the case of using the expression similar to "at least one of A, B and C", it should be explained according to the meaning of the expression generally understood by those skilled in the art (for example, "a system having at least one of A, B and C" should include but not be limited to a system having only A, a system having only B, a system having only C, a system having A and B, a system having A and C, a system having B and C, and/or a system having A, B and C).

Figure 1A:
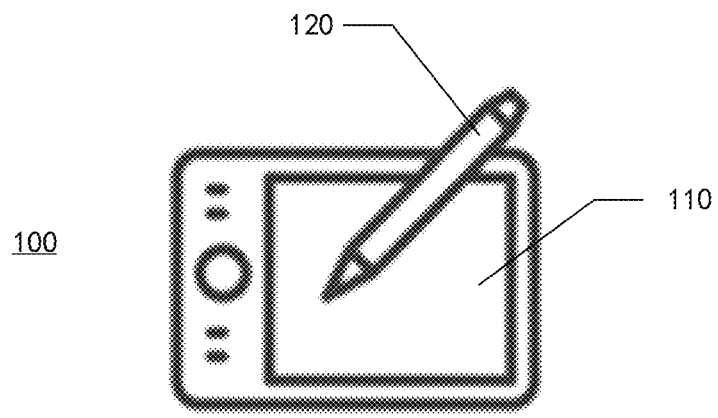
FIGS. 1A~1B schematically show exemplary application scenarios of a handwriting drawing method according to the embodiments of the present disclosure.
Figure 1B:
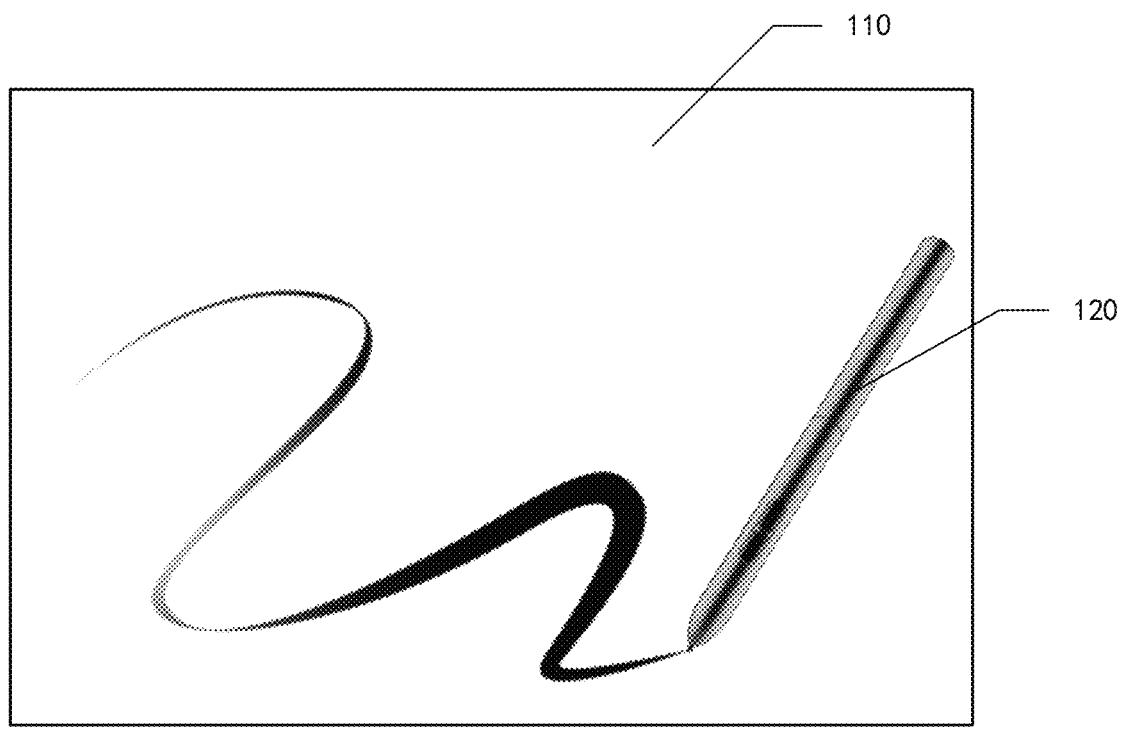

FIGS. 1A~1B schematically show exemplary application scenarios of a handwriting drawing method according to the embodiments of the present disclosure. It should be noted that FIGS. 1A~1B only shows an example of the application scene in which the embodiments of the present disclosure may be applied so as to help those skilled in the art understand technical contents of the present disclosure. It does not mean that the embodiments of the present disclosure may not be used for other apparatuses, systems, environments or scenes.

As shown in FIG. 1A, an electronic apparatus 100 has a touch screen 110. In response to a touch operation (such as writing, drawing) performed by a user on the touch screen 110 through a finger or an input device (such as a stylus pen, digital pen) 120, the electronic apparatus 110 may draw and display a handwriting track corresponding to the above touch operation. Exemplarily, when the user draws a curve on the touch screen 110 by using the stylus pen 120, a drawn handwriting track shown in FIG. 1B is displayed on the touch screen 110.

The electronic apparatus 100 may include, but is not limited to, a smart phone, a smart tablet, a portable computer, a desktop computer, an e-book, or the like. The handwriting drawing method according to the embodiments of the present disclosure may be applied to various scenes that require handwriting display. For example, during a conference or academic report, the user may show the corresponding handwriting on a large-screen smart tablet through writing operations, so as to display and explain the conference content or academic program more flexibly and dynamically.

In general, handwriting drawing solutions for the electronic apparatus may show different thicknesses of handwriting according to user's touch operations, but may not show different depths of handwriting. This results in a large difference between the drawn handwriting and the user's actual handwriting. In addition, in the handwriting drawing, a next handwriting track is drawn after a previous handwriting track has been drawn, which results in slower drawing speed and lag.

According to the embodiments of the present disclosure, there is provided a method of drawing a handwriting track for an electronic apparatus, which is described below. It should be noted that the sequence number of each step in the following method is only used to indicate the step for description, and should not be regarded as indicating the execution order of the steps. Unless explicitly stated, the method does not need to be performed exactly in an order shown below.

Figure 2A:
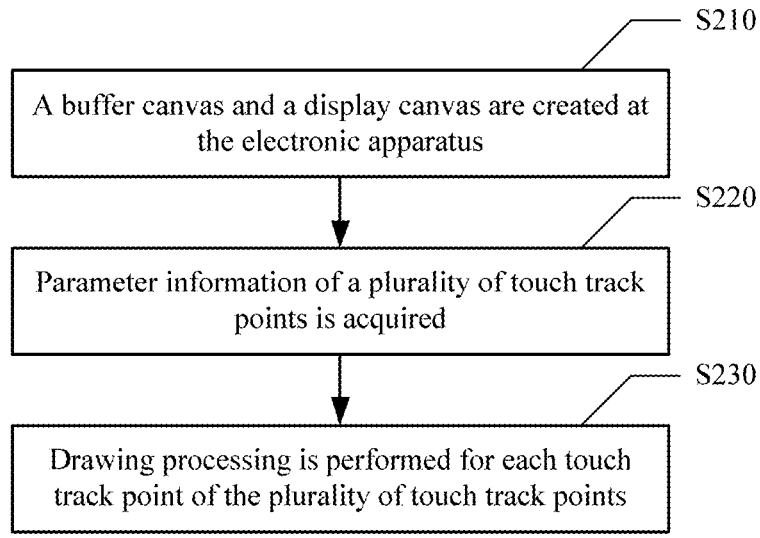
FIGS. 2A~2B schematically show a flowchart of a handwriting drawing method for an electronic apparatus according to an embodiment of the present disclosure.
Figure 2B:
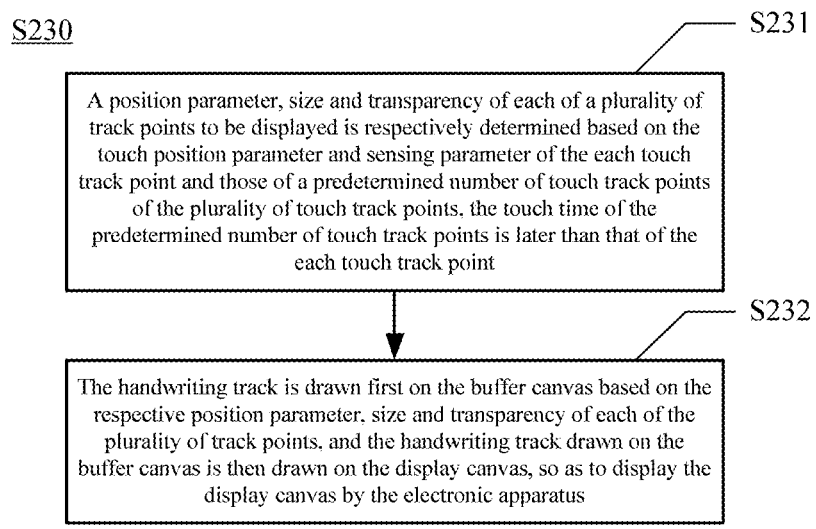

FIGS. 2A-2B schematically show a flowchart of a method of drawing a handwriting track for an electronic apparatus according to an embodiment of the present disclosure.

As shown in FIG. 2A, the method may be performed by a processor, and may include steps S210 to S230.

In step S210, a buffer canvas and a display canvas are created at the electronic apparatus.

The canvas may be HTML (Hyper Text Markup Language) elements. As a graphics container, the canvas may be used to draw written content (such as written text or graphics) by the user by using scripts. According to the embodiments of the present disclosure, the buffer canvas may be, for example, an offscreen canvas, which is used to cache graphics data but not used to display on the screen of the electronic apparatus. The display canvas is used for display on the screen of the electronic apparatus and the user may write on the canvas. When the buffer canvas and the display canvas are created, it is necessary to initialize various attributes of the buffer canvas and the display canvas. For example, it is necessary to set a height and width of each of the buffer canvas and the display canvas to be displayed.

In step S220, parameter information of a plurality of touch track points is acquired.

Exemplarily, during the user's touch operation on the screen of the electronic apparatus, the user's finger or the input device contacts the screen of the electronic apparatus to form a plurality of touch areas (also referred to as touch points). A plurality of touch track points may be selected by sampling from the plurality of touch areas. The plurality of touch track points may be all or part of the touch points, or a combination of all the touch points and interpolation points, or a combination of part of the touch points and interpolation points. The interpolation point is a non-touch point, but a point simulated by the system or algorithm according to the rules of coordinate equal interval or equal time interval. Finally, a set of touch track points (hereinafter referred to as a plurality of touch track points) are obtained.

The parameter information of each touch track point of the plurality of touch track points may contain, for example, one or more of a touch moment when the touch track point occurs (the touch moment may be indicated as a time stamp, for example), a touch position parameter of the touch track point in a coordinate system of the screen of the display screen (the touch position parameter may be indicated as a coordinate value, for example), a sensing parameter, and the like. The sensing parameter may be parameters of various sensing quantities related to the touch operation, which will be explained below.

In step S230, drawing processing may be performed sequentially or simultaneously for each touch track point of the above-mentioned plurality of touch track points.

Exemplarily, reference may be made to FIG. 2B for the implementation process of step S230. As shown in FIG. 2B, for each touch track point acquired (the selected current touch track point), step S230 may include steps S231 to S232.

In step S231, a position parameter, a size and a transparency of each of a plurality of track points to be displayed is respectively determined based on the touch position parameter and sensing parameter of the each touch track point and those of a predetermined number of touch track points of the plurality of touch track points. The touch time of the predetermined number of touch track points is later than that of the each touch track point.

According to the embodiments of the present disclosure, for a touch track point, the predetermined number of touch track points of which the touch time is later than the touch time of the touch track point may be referred to as a predetermined number of next touch track points. The "previous" and "next" in the present disclosure may be referred to in terms of a sequence formed by a plurality of touch track points according to the touch time from early to later, or may be referred to in terms of a sequence formed by a plurality of touch track points according to the acquisition time from early to later.

The track point is a graphic used to form a handwriting track, and the above-mentioned plurality of track points are used to form a handwriting track corresponding to the touch track point. The position parameter of the plurality of track points may show track changes of the handwriting track, the size of the plurality of track points may show the thickness of the handwriting track, and the transparency of the plurality of track points may show the depth of the handwriting track. The size and the transparency of the track points may be determined according to the corresponding sensing parameter. For example, the larger the pressure sensing value corresponding to a track point, the larger the size of the track point and the greater the transparency of the track point (the more opaque it tends to be); or the larger the touch sliding speed corresponding to a track point, the smaller the size of the track point and the smaller the transparency of the track point (the more transparent it tends to be); or the larger the touch area corresponding to a track point, the larger the size of the track point and the greater the transparency of the track point; and so on.

For example, the electronic apparatus determines M touch track points in a time sequence during the user's touch operation, and the above-mentioned predetermined number is N. For the i-th touch track point of the M touch track points acquired, the "predetermined number of next touch track points" includes the i+1-th touch track point, . . . , the i+N-th touch track point, where M is an integer greater than N, N is an integer greater than or equal to 1, and i is an integer greater than or equal to 1. Thus, the position parameter, the size and the transparency of each of the plurality of track points may be determined based on the parameter information of the i-th touch track point, the parameter information of the i+1-th touch track point, . . . , the parameter information of the i+N-th touch track point. The plurality of track points determined are used to form the handwriting track for the i-th touch track point (the "handwriting track for the i-th touch track point" may be referred to as "the i-th handwriting track"). In this way, a first handwriting track is determined based on the parameter information of the first touch track point and that of next N touch track points with respect to the first touch track point; a second handwriting track is determined based on the parameter information of the second touch track point and that of next N touch track points with respect to the second touch track point; . . . ; a M-N-th handwriting track is determined based on the parameter information of the M-N-th touch track point and that of next N touch track points with respect to the M-N-th touch track point. Therefore, according to the processing of step S231, M-N handwriting tracks are generated based on the above-mentioned user's touch operation.

In step S232, the handwriting track is drawn first on the buffer canvas based on the respective position parameter, the size and the transparency of each of the plurality of track points, and the handwriting track drawn on the buffer canvas is then drawn on the display canvas, so as to display the display canvas by the electronic apparatus.

For example, subsequent to determining the respective position parameter, the size and the transparency of each of the plurality of track points used to form the i-th handwriting track, each track point may be drawn on the buffer canvas according to its corresponding position parameter, the size and the transparency, then the plurality of track points drawn on the buffer canvas form the i-th handwriting track. This process is invisible to the user. After the entire drawing of the i-th handwriting track is completed, the i-th handwriting track is drawn on the display canvas as a whole for the user to view. The above-mentioned buffer drawing method is adopted for each of the above-mentioned M-N handwriting tracks. After the i-th handwriting track is drawn on the buffer canvas, no matter whether the i-th handwriting track has been drawn on the display canvas or not, the subsequent handwriting track may be drawn on the buffer canvas, that is, the drawing on the display canvas and the drawing on the buffer canvas may be executed by independent threads.

Those skilled in the art may understand that, according to the handwriting drawing method of the embodiments of the present disclosure, the parameter information of the plurality of touch track points is acquired in response to the user's touch operation on the screen of the electronic apparatus. Relevant information of a plurality of track points, including the position, the size and the transparency of each track point may be determined based on the parameter information of each touch track point and the next touch track points. By drawing the plurality of touch points, the handwriting track for the touch track point may be formed. Since the track point has attributes of position, the size and the transparency, the handwriting track drawn may show the thickness and depth (for example, the handwriting track shown in FIG. 1B), and is closer to the user's actual handwriting. In addition, the drawing process of each handwriting track achieves dual canvas buffer drawing based on the buffer canvas and the display canvas. The dual canvas buffer drawing may support multi-threaded parallel drawing of different handwriting tracks on different canvases, which may effectively improve drawing efficiency. In addition, after multiple drawings of the plurality of track points on the buffer canvas are executed, a single drawing of the entire handwriting track is executed on the display canvas, then a refresh frequency of the display canvas may be reduced, thereby reducing the visible flicker of the user's screen and improving the displaying and drawing effect of the handwriting track.

Figure 3:
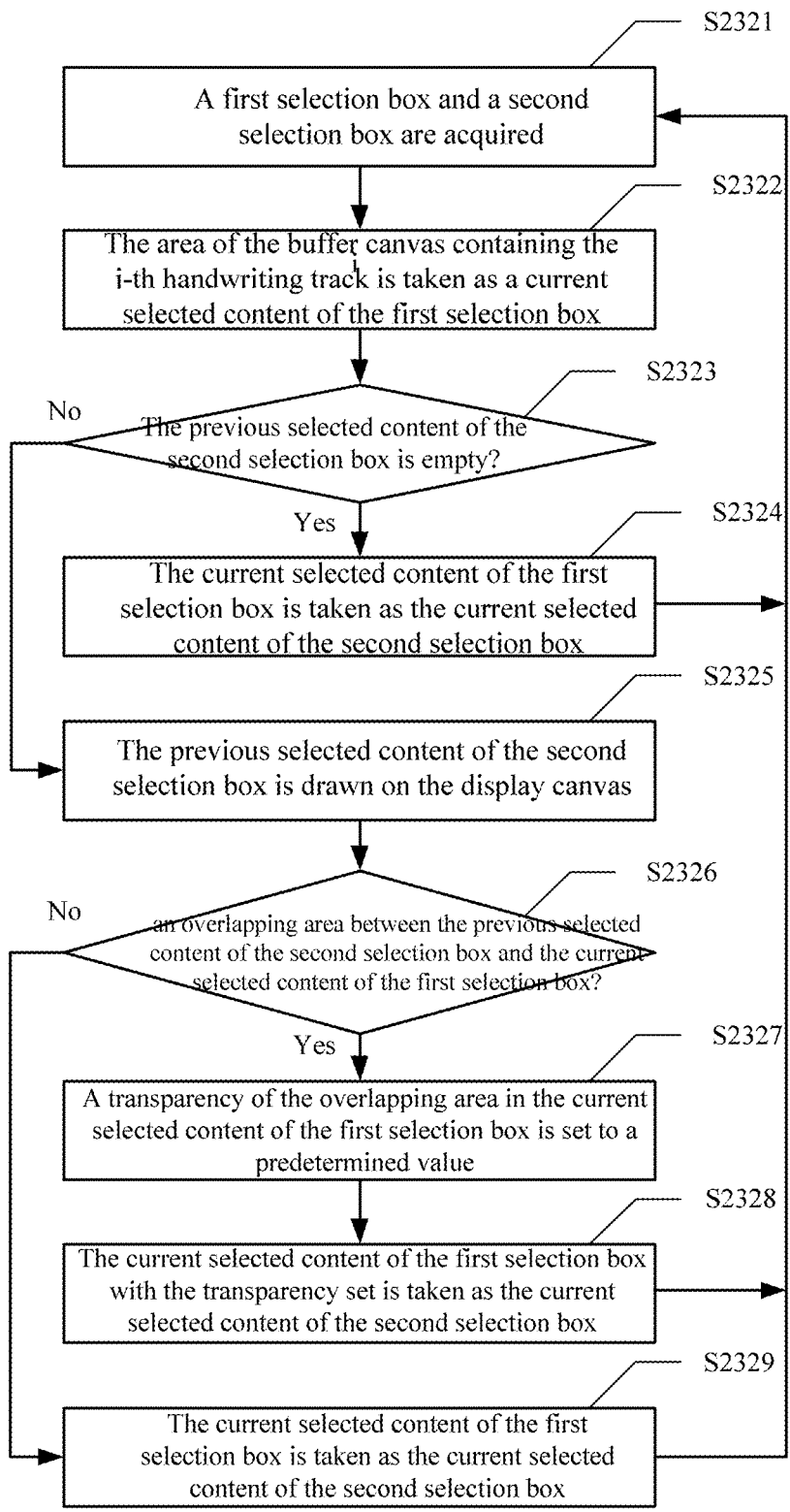
FIG. 3 schematically shows an exemplary flowchart of a handwriting drawing method for an electronic apparatus according to another embodiment of the present disclosure.

FIG. 3 schematically shows an exemplary flowchart of a method of drawing a handwriting track for an electronic apparatus according to another embodiment of the present disclosure, which is used to exemplarily illustrate the implementation process of drawing on the display canvas the handwriting track drawn on the buffer canvas in the step S232.

As shown in FIG. 3, taking the i-th handwriting track as an example, the process of drawing on the display canvas the i-th handwriting track drawn on the buffer canvas may include steps S2321 to S2329.

In step S2321, a first selection box and a second selection box are acquired.

Exemplarily, when creating the buffer canvas and the display canvas, the first selection box and the second selection box and their respective shapes may be created. The first selection box and the second selection box created initially have empty selected contents. In the subsequent handwriting drawing process, the first selection box and the second selection box may be cyclically assigned for use.

In step S2322, the area of the buffer canvas containing the i-th handwriting track is taken as a current selected content of the first selection box.

Figure 4:
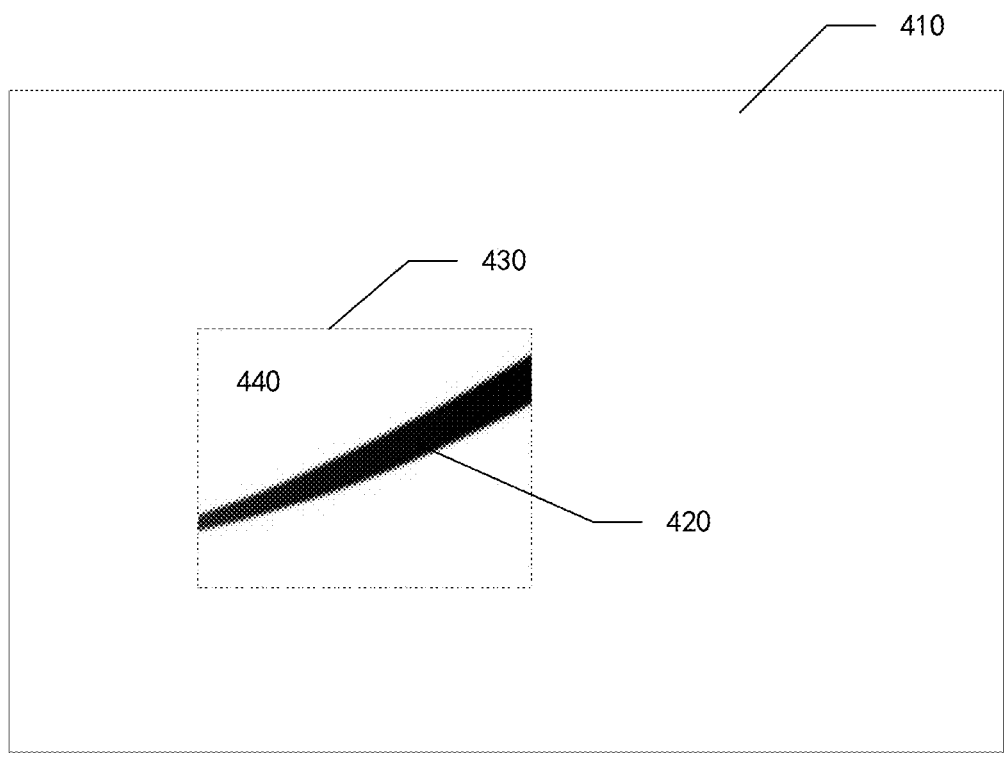
FIG. 4 schematically shows an exemplary diagram of a handwriting track on a buffer canvas according to an embodiment of the present disclosure.

Exemplarily, according to the shape of the first selection box, a smallest area that conforms to the shape of the first selection box and includes the i-th handwriting track may be taken as the current selected content of the first selection box, as shown in FIG. 4. FIG. 4 schematically shows a handwriting track 420 that has been drawn on a buffer canvas 410, and the handwriting track is composed of a plurality of track points. For example, a first selection box 430 is rectangular (shown as dotted line). A rectangular area 440 containing the handwriting track 420 is selected as the current selected content of the first selection box 430. The current selected content of the first selection box 430 may include a picture corresponding to the selected rectangular area 440 (which may be referred to as "a selected picture") and a position parameter of the selected rectangular area 440 in the buffer canvas, such as the coordinate parameter of at least one of the upper left corner, the upper right corner, the lower left corner and the lower right corner.

Continuing to refer to FIG. 3, in step S2323, it is determined whether the previous selected content of the second selection box is empty or not. If yes, step S2324 is executed. If not, step S2325 is executed.

Exemplarily, when i is equal to 1, it means that the handwriting track has not been drawn, and the second selection box has not been assigned a value, thus the previous selected content of the second selection box is empty. When i is greater than 1, the previous selected content of the second selection box is the area of the buffer canvas containing the i−1-th handwriting track. At this time, the previous selected content of the second selection box is not empty.

In step S2324, the current selected content of the first selection box is taken as the current selected content of the second selection box. Then, the process returns to step S2321 to start a new round.

According to the embodiments of the present disclosure, when the previous selected content of the second selection box is empty, the current selected content of the first selection box may be directly assigned to the second selection box. As described above, the current selected content of the first selection box is the area of the buffer canvas containing the i-th handwriting track, so the current selected content of the second selection box is also this area, which has position attributes and image attributes. It may be understood that the "current" and "previous" in the embodiments of the present disclosure are referred to in terms of the handwriting track currently being drawn. For example, when drawing the i+1-th handwriting track, the area in the first selection box containing the i-th handwriting track is taken as the previous selected content of the first selection box, and the area in the second selection box containing the i-th handwriting track is taken as the previous selected content of the second selection box.

In step S2325, the previous selected content of the second selection box is drawn on the display canvas.

According to the embodiments of the present disclosure, if the previous selected content of the second selection box is the area of the buffer canvas containing the i−1-th handwriting track, the area containing the i−1-th handwriting track needs to be drawn on the display canvas first, and then the selected content of the first selection box is assigned to the second selection box.

Exemplarily, in order to facilitate a unified measurement of the coordinate positions of the drawn graphics, the buffer canvas and the display canvas may be set to have the same size, that is, the same height and the same width. The previous selected content of the second selection box may include: the selected picture corresponding to the previous selected content of the second selection box (for example, the picture corresponding to the area of the buffer canvas containing the i−1-th handwriting track) and the position parameter of the selected picture in the buffer canvas (for example, the coordinates of the upper left corner of the selected picture). In step S2325, the drawing the previous selected content of the second selection box on the display canvas may include: drawing the selected picture as a whole on the display canvas (for example, pasting the selected picture on the display canvas as a whole) according to the position parameter of the selected picture corresponding to the previous selected content of the second selection box in the buffer canvas, so as to draw the i−1-th handwriting track on the display canvas.

In step S2326, it is determined whether there is an overlapping area between the previous selected content of the second selection box and the current selected content of the first selection box. If yes, step S2327 is executed. If not, step S2329 is executed.

In step S2327, a transparency of the overlapping area in the current selected content of the first selection box is set to a predetermined value.

In step S2328, the current selected content of the first selection box with the transparency set is taken as the current selected content of the second selection box. Then, the process returns to step S2321 to start a new round.

Figure 5:
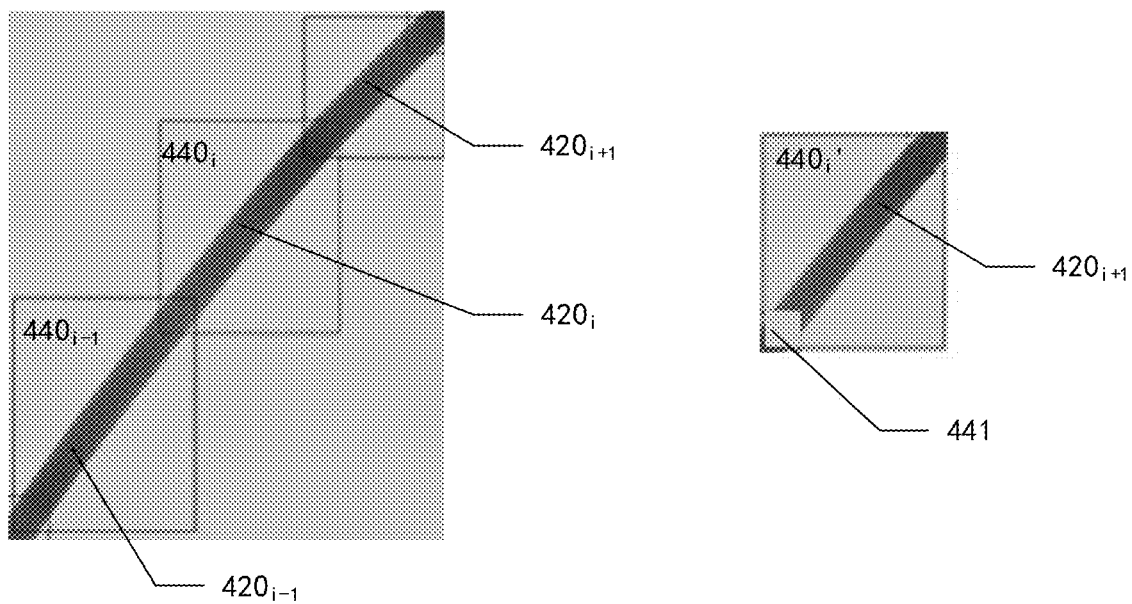
FIG. 5 schematically shows an exemplary diagram of a handwriting track on a buffer canvas according to another embodiment of the present disclosure.

The steps S2326 to S2328 are exemplarily described below with reference to FIG. 5. As shown in FIG. 5, the i−1-th handwriting track $420_{i-1}$, the i-th handwriting track $420_i$ and the i+1-th handwriting track $420_{i+1}$ are drawn on the buffer canvas. When it is desired to draw the i-th handwriting track on the display canvas, the previous selected content of the second selection box is the area $440_{i-1}$ of the buffer canvas containing the i−1-th handwriting track, and the area $440_i$ of the buffer canvas containing the i-th handwriting track is taken as the current selected content of the first selection box.

Since there is an overlapping area between the area $440_{i-1}$ and the area 4401 (for example, the overlapping portion between the upper right corner of the area $440_{i-1}$ and the lower left corner of the area 4401), if the area $440_{i-1}$ is first drawn on the display canvas, and the area $440_i$ is then drawn on the display canvas, the overlapping area between the two may be drawn repeatedly, which causes an overlay of the transparency of the track points in the overlapping area. In order to avoid the transparency overlay caused by repeated drawing of the overlapping area, after the previous selected content $440_{i-1}$ of the second selection box is drawn on the display canvas, a transparency setting is made to the overlapping area in the current selected content $440_i$ of the first selection box. For example, the transparency of pixels in the overlapping area 441 is set to 0, so that the overlapping area 441 is completely transparent, then an area $440_{i'}$ is obtained. Then, the area $440_{i'}$ is assigned to the second selection box as the current selected content of the second selection box. When the area of the buffer canvas containing the i+1-th handwriting track is assigned to the selected content of the first selection box next time, the area $440_{i'}$ in the second selection box is drawn on the display canvas. At this time, since the area $440_{i'}$ is completely transparent with respect to the overlapping area 441 of the area $440_{i-1}$ that has been drawn on the display canvas, repeated drawing of the overlapping area 441 on the display canvas is avoided, thereby avoiding transparency overlay errors.

Continuing to refer to FIG. 3, if there is no overlapping area between the previous selected content of the second selection box and the current selected content of the first selection box, it means that there is no repeated drawing between the previous and current drawn contents on the display canvas. Accordingly, in step S2329, the current selected content of the first selection box may be directly taken as the current selected content of the second selection box. Then, the process returns to step S2321.

Those skilled in the art may understand that the handwriting drawing method according to the embodiments of the present disclosure may sequentially generate a plurality of handwriting tracks each having a size (for example, width) and a transparency based on the parameter information of the touch track points acquired. The process shown in FIG. 3 may be executed for each handwriting track. By a step-by-step drawing method with the first selection box and the second selection box, the handwriting tracks drawn on the buffer canvas are sequentially drawn on the display canvas. The step-by-step drawing method makes the drawing process on the buffer canvas and the drawing process on the display canvas independent of each other. For example, when the i−1-th handwriting track and the i-th handwriting track are drawn on the display canvas as shown in FIG. 5, the drawing of the i+1-th handwriting track on the buffer canvas is not affected. Therefore, the handwriting drawing speed may be effectively optimized, and the lag of the handwriting drawing process relative to the actual touch operation process may be improved. In addition, in the step-by-step drawing process, the transparency of the overlapping area of the first selection box with respect to the second selection box is set to avoid repeated drawing of the overlapping area on the display canvas, thereby avoiding the influence of the transparency overlay error on the depth of the handwriting track.

According to the embodiments of the present disclosure, the parameter information of each touch track point of the plurality of touch track points acquired above may contain, for example, the touch position parameter of the each touch track point and the sensing parameter of the each touch track point. Exemplarily, the sensing parameter of the each touch track point may contain at least one of a pressure sensing value of the touch track point, a touch sliding speed of the touch track point (for example, the average touch sliding speed from the previous touch track point to the touch track point. For the first touch track point acquired, the touch sliding speed may be set to 0), and a touch area of the touch track point. The above-mentioned sensing parameters may reflect different characteristics of the user's touch operations such as writing and drawing on the electronic apparatus. If the size and the transparency of the handwriting track are designed based on these characteristics, a drawn handwriting track that is more compatible with the user's handwriting may be obtained.

Hereinafter, referring to FIG. 6, the handwriting drawing method of the present disclosure is exemplarily described in combination with another embodiment. It may be understood that FIG. 6 is used to exemplarily illustrate another implementation of the handwriting drawing method according to the embodiments of the present disclosure, and does not limit the embodiments of the present disclosure.

Figure 6:
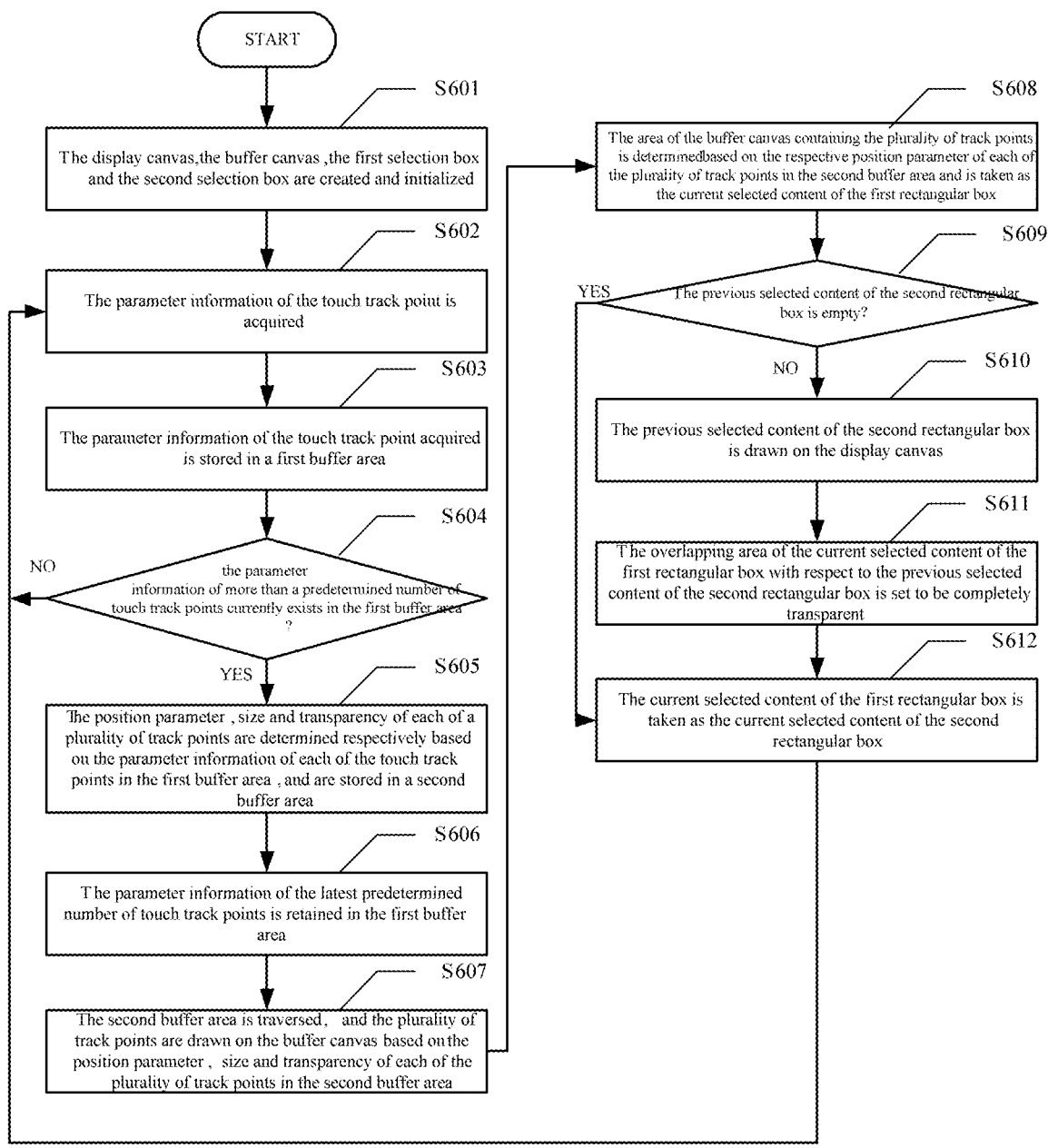
FIG. 6 schematically shows an exemplary flowchart of a handwriting drawing method for an electronic apparatus according to another embodiment of the present disclosure.

FIG. 6 schematically shows an exemplary flowchart of a method of drawing a handwriting track for an electronic apparatus according to another embodiment of the present disclosure.

As shown in FIG. 6, the method may include steps S601 to S612.

In step S601, the display canvas, the buffer canvas, the first selection box and the second selection box are created and initialized.

According to the embodiments of the present disclosure, in this step S601, the creation and initialization of the canvases and selection boxes may be performed according to the implementation of the above step S210 and the step S2321. Exemplarily, a display canvas canvas1 and a buffer canvas canvas2 may be created. Through the initial setting, the display canvas canvas1 and the buffer canvas canvas2 have the same size, such as 150 pixels×300 pixels. A first selection box dirtyRect1 and a second selection box dirtyRect2 for the step-by-step drawing are created. Through the initial setting, the initial selected contents of the first selection box dirtyRect1 and the second selection box dirtyRect2 are both empty.

In step S602, the parameter information of the touch track point is acquired.

Exemplarily, the electronic apparatus periodically determines the touch track points and generates parameter information of each touch track point based on the user's touch operations such as writing and drawing on the screen. In this example, the parameter information of each touch track point may contain the touch time of the touch track point, the touch position parameter, and the pressure sensing value of the touch track point.

In step S603, the parameter information of the touch track point acquired is stored in a first buffer area.

In step S604, it is determined whether the parameter information of more than a predetermined number of touch track points currently exists in the first buffer area. If yes, step S605 is executed. If not, it means that the number of the existing touch track points is not sufficient to generate a handwriting track, then the process returns to step S602.

In step S605, the position parameter, the size and the transparency of each of a plurality of track points are determined respectively based on the parameter information of each of the touch track points in the first buffer area, and are stored in a second buffer area.

Figure 7A:
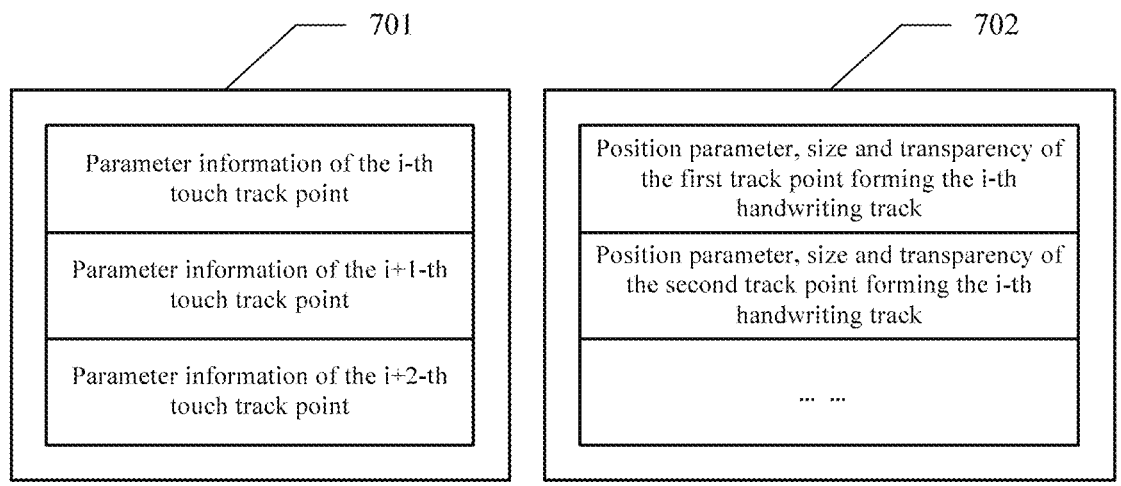
FIG. 7A schematically shows an exemplary diagram of a first buffer area and a second buffer area according to an embodiment of the present disclosure.

Next, referring to FIG. 7A, steps S604 to S605 are exemplified in combination with specific examples. As shown in FIG. 7A, for example, the predetermined number is 2. After the parameter information of the i+2-th touch track point is acquired, the parameter information of the i+2-th touch track point is stored in a first buffer area Cache 701. If the parameter information of the i-th touch track point and the parameter information of the i+1-th touch track point currently exist in the first buffer area Cache 701, it is determined that the parameter information of the existing touch track points in the first buffer area Cache 701 is sufficient to determine the i-th handwriting track. Therefore, the respective position parameter, the size and the transparency of each of the plurality of track points used to form the i-th handwriting track is determined based on the parameter information of the i-th touch track point, the parameter information of the i+1-th touch track point and the parameter information of the i+2-th touch track point, and is stored in a second buffer area Collection 702 to cover the original data in the second buffer area Collection 702.

According to the embodiments of the present disclosure, for example, the process of determining the respective position parameter, the size and the transparency of each of the plurality of track points in step S605 may include: performing fitting to obtain a curve based on the parameter information of the i-th touch track point and the respective parameter information of each of a predetermined number of next touch points with respect to the i-th touch track point, and determining the respective position parameter and sensing parameter of each of the plurality of points on the curve. Then, the position parameter of each of the plurality of points is respectively taken as the position parameter of each of the plurality of track points. Furthermore, the size and the transparency of each of the plurality of track point is respectively determined based on the sensing parameter of each of the plurality of points.

Following the above example where the predetermined number is 2, for the i-th touch track point, a first next touch track point with respect to the i-th touch track point is the i+1-th touch track point, and a second next touch track point with respect to the i-th touch track point is the i+2-th touch track point. Based on the parameter information of the i-th touch track point, the parameter information of the i+1-th touch track point and the parameter information of the i+2-th touch track point, the position parameter and sensing parameter of each of a start point $P_{i0}$, a control point $P_{i1}$ and an end point $P_{i2}$ for curve fitting are determined. The implementation of this process may refer to FIG. 7B.

Figure 7B:
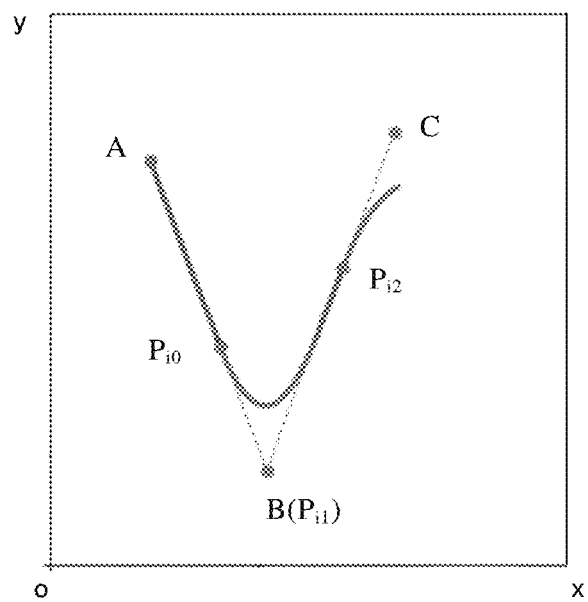
FIG. 7B schematically shows an exemplary diagram of a fitting curve according to an embodiment of the present disclosure.

FIG. 7B schematically shows an exemplary diagram of a curve fitting according to an embodiment of the present disclosure. As shown in FIG. 7B, in a rectangular coordinate system o-xy, the touch position parameter of the i-th touch track point A is $(x_i, y_i)$ (for example, position coordinates of a center point of the i-th touch track point), and the sensing parameter of the i-th touch track point A is a pressure sensing value $F_i$ (for example, a pressure sensing value of the center point of the i-th touch track point, or an average pressure sensing value of the i-th touch track point, or a maximum pressure sensing value of the i-th touch track point). Similarly, the touch position parameter of the i+1-th touch track point B is $(x_{i+1}, y_{i+1})$, and the sensing parameter of the i+1-th touch track point B is the pressure sensing value $F_{i+1}$. The touch position parameter of the i+2-th touch track point C is $(x_{i+2}, y_{i+2})$, and the sensing parameter of the i+2-th touch track point C is a pressure sensing value $F_{i+2}$.

For example, a point (such as a midpoint) on a connecting line between the i-th touch track point A and the i+1-th touch track point B (the dotted line between A and B in FIG. 7B) is selected as the start point $P_{i0}$. The position and sensing parameters $((x_{i0}, y_{i0}), F_{i0})$ of the start point $P_{i0}$ is calculated based on $((x_i, y_i), Fi)$ and $((x_{i+1}, y_{i+1}), F_{i+1})$ by using the interpolation algorithm. A center point of the i+1-th touch track point B is selected as the control point $P_{i1}$. The position and sensing parameters $((x_{i1}, y_{i1}), F_{i1})$ of the control point $P_{i1}$ are equal to $((x_{i+1}, y_{i+1}), F_{i+1})$. For example, a point (such as a midpoint) on a connecting line between the i+1-th touch track point B and the i+2-th touch track point C (the dotted line between B and C in FIG. 7B) is selected as the end point $P_{i2}$. The position and sensing parameters $((x_{i2}, y_{i2}), F_{i2})$ of the end point $P_{i2}$ are calculated based on $((x_{i+1}, y_{i+1}), F_{i+1})$ and $((x_{i+2}, y_{i+2}), F_{i+2})$ by using the interpolation algorithm.

Next, a fitting is performed for the position parameter of each of the start point $P_{i0}$, the control point $P_{i1}$ and the end point $P_{i2}$ to obtain a second-order Bezier curve, so as to determine a second-order Bezier curve equation. According to a predetermined step length, a plurality of points between the start point $P_{i0}$ and the end point $P_{i2}$ are selected from the second-order Bezier curve according to the second-order Bezier curve equation, and the respective position parameters of the plurality of points are determined. Then, the respective sensing parameters of the plurality of points selected are determined based on the second-order Bezier curve equation and the respective sensing parameters of the start point $P_{i0}$, the control point $P_{i1}$ and the end point $P_{i2}$.

The plurality of points selected above may correspond to the plurality of track points used to form the i-th handwriting track. For example, the position parameter of the j-th point selected may be used as the position parameter of the j-th track point of the plurality of track points, and the sensing parameter of the j-th point selected may be used as the j-th track point of the plurality of track points, where j is an integer greater than or equal to 1.

According to the embodiments of the present disclosure, a first mapping table and a second mapping table are preset in the electronic apparatus. The first mapping table may be used to characterize the corresponding relationship between the sensing parameter and the size of the track point, and the second mapping table may be used to characterize the corresponding relationship between the sensing parameter and the transparency of the track point. After determining the sensing parameter of each track point, the size corresponding to the sensing parameter of the track point (for example, when the track point is a circle, the size represents a radius. Or when the track point is a square, the size represents a side length) is determined according to the first mapping table, and is taken as the size of the track point. Similarly, the transparency corresponding to the sensing parameter of the track point is determined according to the second mapping table and is taken as the transparency of the track point.

It may be understood that, in the above embodiments of the present disclosure, a second-order Bezier curve fitting method is adopted to generate each handwriting track. It is only required to acquire three touch track points to generate a handwriting track, which is more efficient. Moreover, since the points in the real touch track points are directly used as the control points in curve fitting, the amount of calculation may be reduced. Further, according to the embodiments of the present disclosure, the size and the transparency of the plurality of track points used to form the handwriting track are determined based on the curve fitting, so that the thickness and depth of the handwriting track finally presented are changed with the change of the sensing parameter. For example, when the pressure sensing value is greater, the handwriting track has a larger width and tends to be more opaque. When the touch sliding speed is greater, the handwriting track has a smaller width and tends to be more transparent. When the touch area is larger, the handwriting track has a larger width and becomes more opaque. In this way, the drawn handwriting track reflects the user's handwriting characteristics during the touch operations such as writing and drawing. In other examples, the predetermined number may be set to other values, the curve fitting may be performed for other types of curves, and the sensing parameters may be selected according to actual needs. This example is only used to illustrate the implementation principle of the embodiments of the present disclosure and does not limit the embodiments of the present disclosure.

Continuing to refer to FIG. 6, in step S606, the parameter information of the latest predetermined number of touch track points is retained in the first buffer area.

Exemplarily, after the position parameter, the size and the transparency of each of the plurality of track points used to form the i-th handwriting track are respectively determined based on the parameter information of the i-th touch track point, the parameter information of the i+1-th touch track point and the parameter information of the i+2-th touch track point and are stored in the second buffer area Collection, the parameter information of redundant touch track points may be removed from the first buffer area Cache in order to avoid unnecessary occupation of storage space. For example, the parameter information of the i-th touch track point is deleted from the first buffer area Cache to optimize an operating speed of the electronic apparatus.

In step S607, the second buffer area is traversed, and the plurality of track points are drawn on the buffer canvas based on the position parameter, the size and the transparency of each of the plurality of track points in the second buffer area.

Exemplarily, since the respective position parameter, the size and the transparency of each of the plurality of track points used to form the i-th handwriting track are currently stored in the second buffer area Collection, the i-th handwriting track is formed on the buffer canvas after each of the plurality of track points is drawn on the buffer canvas with the respective position, the size and the transparency.

In step S608, the area of the buffer canvas containing the plurality of track points is determined based on the respective position parameter of each of the plurality of track points in the second buffer area and is taken as the current selected content of the first rectangular box.

In step S609, it is determined whether the previous selected content of the second rectangular box is empty or not. If not, step S610 is executed. If yes, step S612 is executed.

In step S610, the previous selected content of the second rectangular box is drawn on the display canvas.

In step S611, the overlapping area of the current selected content of the first rectangular box with respect to the previous selected content of the second rectangular box is set to be completely transparent.

In step S612, the current selected content of the first rectangular box is taken as the current selected content of the second rectangular box.

The above steps S608 to S612 may be implemented in the manner shown in FIG. 3, which have been described in detail above and will not be repeated here.

Figure 8:
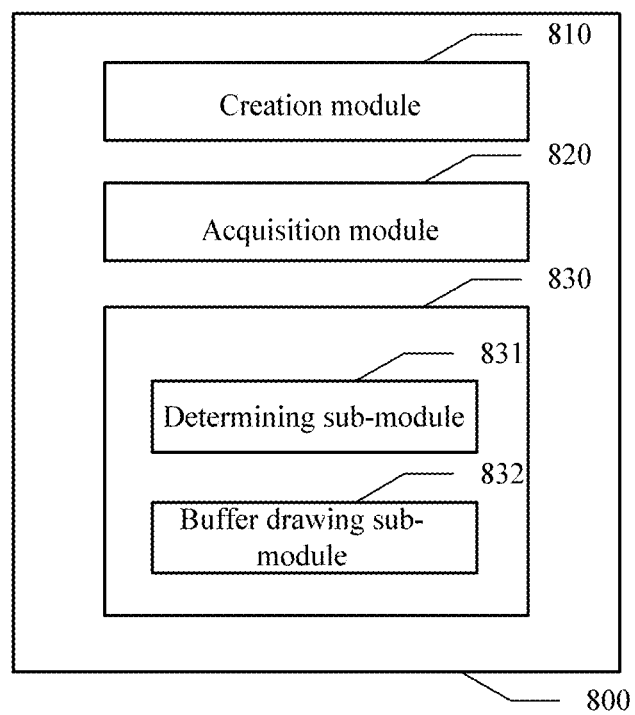
FIG. 8 schematically shows a block diagram of a handwriting drawing device for an electronic apparatus according to an embodiment of the present disclosure.

FIG. 8 schematically shows a block diagram of a handwriting drawing device for an electronic apparatus according to an embodiment of the present disclosure.

As shown in FIG. 8, a handwriting drawing device 800 for the electronic apparatus may include a creation module 810, an acquisition module 820 and a drawing module 830. The drawing module 830 may include a determining sub-module 831 and a buffer drawing sub-module 832.

The creation module 810 is configured to create a buffer canvas and a display canvas at the electronic apparatus.

The acquisition module 820 is configured to acquire parameter information of each touch track point of a plurality of touch track points, and the parameter information of each touch track point contains a touch time, touch position parameter and sensing parameter.

The drawing module 830 is configured to perform drawing processing on each touch track point of the plurality of touch track points. Exemplarily, the determining sub-module 831 is configured to determine a position parameter, the size and the transparency of each of a plurality of track points to be displayed respectively, based on the touch position parameter and sensing parameter of the each touch track point and those of a predetermined number of touch track points of the plurality of touch track points. A touch time of the predetermined number of touch track points is later than that of the each touch track point. The buffer drawing sub-module 832 is configured to draw a handwriting track on the buffer canvas based on the respective position parameter, the size and the transparency of each of the plurality of track points, and draw on the display canvas the handwriting track drawn on the buffer canvas, so as to display the display canvas by the electronic apparatus.

Any number of the modules, sub modules, units and sub units according to the embodiments of the present disclosure, or at least part of the functions of any number of them may be implemented in one module. Any one or more of the modules, sub modules, units and sub units according to the embodiments of the present disclosure can be split into multiple modules for implementation. Any one or more of the modules, sub modules, units and sub units according to the embodiments of the present disclosure can be implemented at least partially as a hardware circuit, such as a field programmable gate array (FPGA), a programmable logic array (PLA), a system on a chip, a system on a substrate, a system on a package, an Application Specific Integrated Circuit (ASIC), or can be implemented by hardware or firmware in any other reasonable way that integrates or encapsulates the circuit, or can be implemented by any one of the three implementation modes of software, hardware and firmware or an appropriate combination thereof. Alternatively, one or more of the modules, sub modules, units and sub units according to the embodiments of the present disclosure can be at least partially implemented as a computer program module that, when executed, perform the corresponding functions.

Figure 9:
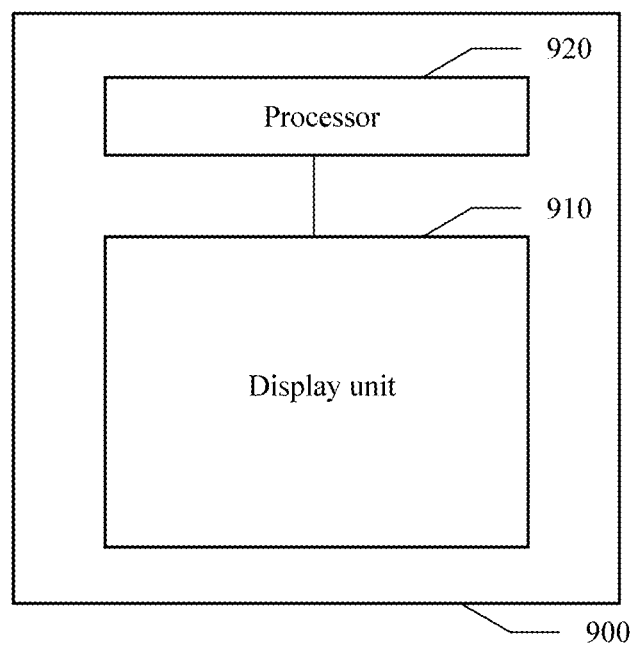
FIG. 9 schematically shows a block diagram of an electronic apparatus according to an embodiment of the present disclosure.

FIG. 9 schematically shows a block diagram of an electronic apparatus suitable for implementing the above-described method according to an embodiment of the present disclosure. The electronic apparatus shown in FIG. 9 is only an example, and should not bring any limitation to the function and scope of use of the embodiments of the present disclosure.

As shown in FIG. 9, an electronic apparatus 900 may include a display unit 910 and at least one processor 920. The display unit 910 is configured to receive a touch event. For example, when the user performs a touch operation such as writing or drawing on the screen of the electronic apparatus, the display unit 910 receives a touch event for the touch operation. The at least one processor 920 is configured to perform the method according to the embodiments of the present disclosure in response to the touch event, so that the display unit 910 displays the handwriting track drawn on the display canvas.

Figure 10:
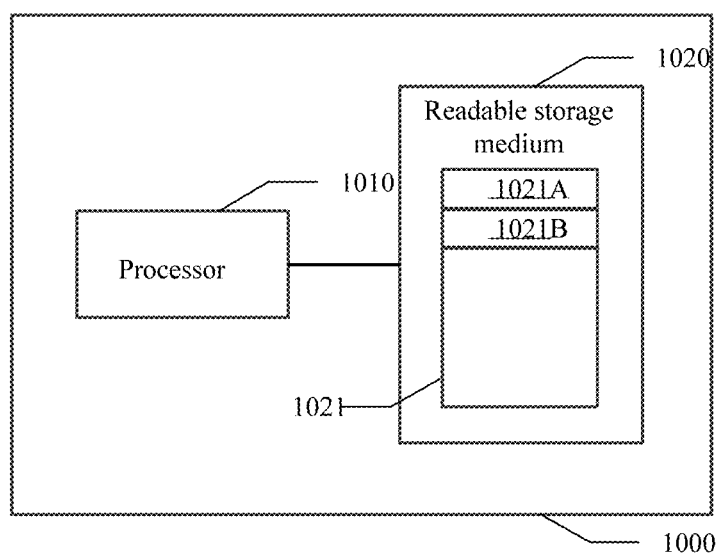
FIG. 10 schematically shows a block diagram of an electronic apparatus according to another embodiment of the present disclosure.

FIG. 10 schematically shows a block diagram of an electronic apparatus suitable for implementing the above-described method according to another embodiment of the present disclosure. The electronic apparatus shown in FIG. 10 is only an example, and should not bring any limitation to the function and scope of use of the embodiments of the present disclosure.

As shown in FIG. 10, an electronic apparatus 1000 includes one or more processors 1010 and a non-transitory computer-readable storage medium 1020. The electronic apparatus 1000 may perform the method according to the embodiments of the present disclosure.

For example, the processor 1010 may include, for example, a general-purpose microprocessor, an instruction set processor and/or a related chipset and/or a special-purpose microprocessor (for example, an application specific integrated circuit (ASIC)), and the like. The processor 1010 may also include an on-board memory for caching purposes. The processor 1010 may be a single processing unit or a plurality of processing units for executing different actions of the method flow according to the embodiments of the present disclosure.

The non-transitory computer-readable storage medium 1020, for example, may be a non-volatile computer-readable storage medium. Specific examples include, but are not limited to: a magnetic storage device, such as a magnetic tape or a hard disk (HDD); an optical storage device, such as a compact disc (CD-ROM); a memory, such as a random access memory (RAM) or a flash memory; and so on.

The non-transitory computer-readable storage medium 1020 may include a computer program 1021. The computer program 1021 may include code/computer-executable instructions that, when executed by the processor 1010, cause the processor 1010 to perform the method according to the embodiments of the present disclosure or any modification thereof.

The computer program 1021 may be configured as a computer program code having, for example, computer program modules. For example, in the exemplary embodiments, the code in the computer program 1021 may contain one or more program modules, such as 1021A, 1021B, . . . . It should be noted that the division method and number of modules are not fixed. Those skilled in the art may use appropriate program modules or program module combinations according to actual conditions. When these program module combinations are executed by the processor 1010, they may cause the processor 1010 to perform the method according to the embodiments of the present disclosure or any modification thereof.

The embodiments of the present disclosure further provide a non-transitory computer-readable storage medium, which may be included in the apparatus/device/system described in the above embodiments; or exist alone without being assembled into the apparatus/device/system. The above-mentioned computer-readable storage medium carries one or more programs that when executed, perform the method according to the embodiments of the present disclosure.

According to the embodiments of the present disclosure, the non-transitory computer-readable storage medium may be a non-volatile computer-readable storage medium, for example, may include but not limited to: portable computer disk, hard disk, random access memory (RAM), read-only memory (ROM), erasable programmable read-only memory (EPROM or flash memory), portable compact disk read-only memory (CD-ROM), optical storage device, magnetic storage device, or any suitable combination of the above. In the present disclosure, the non-transitory computer-readable storage medium may be any tangible medium that includes or stores programs that may be used by or in combination with an instruction execution system, apparatus, or device.

The embodiments of the present disclosure further provide a computer program product, which may be included in the apparatus/device/system described in the above embodiments; or exist alone without being assembled into the apparatus/device/system. The above-mentioned computer program product carries executable instructions that when executed, perform the method according to the embodiments of the present disclosure.

Although the present disclosure has been shown and described with reference to specific exemplary embodiments of the present disclosure, those skilled in the art should understand that without departing from the spirit and scope of the present disclosure defined by the appended claims and their equivalents, various variations in form and details may be made to the present disclosure. Therefore, the scope of the present disclosure should not be limited to the above-mentioned embodiments, but should be defined by the appended claims and their equivalents.

What is claimed is:

1. A method of drawing a handwriting track for an electronic apparatus, comprising:
creating a buffer canvas and a display canvas at the electronic apparatus;
acquiring parameter information of a plurality of touch track points, wherein the parameter information contains a touch time, touch position parameter and sensing parameter; and
performing, for each touch track point of the plurality of touch track points:
determining a position parameter, a size and a transparency of each of a plurality of track points to be displayed respectively, based on the touch position parameter and sensing parameter of the each touch track point and those of a predetermined number of touch track points of the plurality of touch track points, wherein the touch time of the predetermined number of touch track points being later than that of the each touch track point; and
drawing a handwriting track on the buffer canvas based on the position parameter, the size and the transparency of each of the plurality of track points, and drawing on the display canvas the handwriting track drawn on the buffer canvas, so as to display the display canvas by the electronic apparatus,
wherein the drawing on the display canvas the handwriting track drawn on the buffer canvas comprises:
acquiring a first selection box and a second selection box;
taking an area of the buffer canvas containing the handwriting track as a current selected content of the first selection box;
determining whether a previous selected content of the second selection box is empty or not;
taking the current selected content of the first selection box as a current selected content of the second selection box, in response to determining that the previous selected content of the second selection box is empty; and
drawing the previous selected content of the second selection box on the display canvas, in response to determining that the previous selected content of the second selection box is not empty.

2. The method according to claim 1, wherein the drawing on the display canvas the handwriting track drawn on the buffer canvas further comprises, subsequent to drawing the previous selected content of the second selection box on the display canvas:
determining whether there is an overlapping area between the previous selected content of the second selection box and the current selected content of the first selection box;
setting a transparency of the overlapping area in the current selected content of the first selection box to a predetermined value, in response to determining that there is an overlapping area; and
taking the current selected content of the first selection box with the transparency set, as the current selected content of the second selection box.

3. The method according to claim 2, wherein the drawing on the display canvas the handwriting track drawn on the buffer canvas further comprises:
taking the current selected content of the first selection box as the current selected content of the second selection box, in response to determining that there is no overlapping area.

4. The method according to claim 1, wherein the buffer canvas and the display canvas have same height and same width;
wherein the previous selected content of the second selection box contains a selected picture corresponding to the previous selected content and a position parameter of the selected picture in the buffer canvas; and
wherein the drawing the previous selected content of the second selection box on the display canvas comprises drawing the selected picture on the display canvas based on the position parameter of the selected picture in the buffer canvas.

5. The method according to claim 1, wherein the taking an area of the buffer canvas containing the handwriting track as the current selected content of the first selection box comprises:
taking the area containing the handwriting track as the current selected content of the first selection box subsequent to determining that the previous selected content of the first selection box has been taken as the previous selected content of the second selection box.

6. The method according to claim 1, wherein the determining a position parameter, the size and the transparency of each of a plurality of track points to be displayed respectively, based on the touch position parameter and sensing parameter of the each touch track point and those of a predetermined number of touch track points of the plurality of touch track points comprises:
performing fitting to obtain a curve based on the touch position parameter and sensing parameter of the each touch track point and those of the predetermined number of touch track points, and determining a position parameter and sensing parameter of each of a plurality of points on the curve respectively;
taking the position parameter of each of the plurality of points respectively as the position parameter of each of the plurality of track points; and
determining the size and the transparency of each of the plurality of track points respectively based on the sensing parameter of each of the plurality of points.

7. The method according to claim 6, wherein the performing fitting to obtain a curve and determining a position parameter and sensing parameter of each of a plurality of points on the curve respectively comprises:
determining a position parameter and sensing parameter of each of a start point, a control point and an end point respectively based on the touch position parameter and sensing parameter of the each touch track point and those of next two touch track points of the plurality of touch track points, wherein a touch time of the next two touch track points being later than that of the touch track point;
determining a second-order Bezier curve equation based on the position parameter of each of the start point, the control point and the end point;
determining the position parameter of each of the plurality of points respectively based on the second-order Bezier curve equation; and
determining the sensing parameter of each of the plurality of points respectively based on the second-order Bezier curve equation and the sensing parameter of each of the start point, the control point and the endpoint.

8. The method according to claim 7, wherein the touch position parameter of the touch track point contains a position parameter of a center point of the touch track point, and the sensing parameter of the touch track point contains a sensing parameter of the center point of the touch track point;

wherein the determining a position parameter and sensing parameter of each of a start point, a control point and an end point respectively based on the touch position parameter and sensing parameter of the each touch track point and those of next two touch track points of the plurality of touch track points comprises:

calculating a position parameter and a sensing parameter of a midpoint of a connecting line between the touch track point and a next first touch track point of the next two touch track points based on the touch position parameter and sensing parameter of the touch track point and those of the next first touch track point, as the position parameter and the sensing parameter of the start point;

taking the touch position parameter and the sensing parameter of a center point of the next first touch track point as the position parameter and the sensing parameter of the control point; and calculating a position parameter and a sensing parameter of a midpoint of a connecting line between the next first touch track point and a next second touch track point of the next two touch track points based on the touch position parameter and the sensing parameter of the next first touch track point and those of the next second touch track point, as the position parameter and the sensing parameter of the end point.

9. The method according to claim 6, wherein the determining the size and the transparency of each of the plurality of track points respectively based on the sensing parameter of each of the plurality of points comprises:

presetting a first mapping table and a second mapping table;

determining, for each of the plurality of points, a size corresponding to the sensing parameter of the point as the size of one of the plurality of track points, based on the first mapping table; and determining a transparency corresponding to the sensing parameter of the point as the transparency of the track point, based on the second mapping table.

10. The method according to claim 6, wherein the sensing parameter of the touch track point contains at least one of:

a pressure sensing value of the touch track point;

a touch sliding speed of the touch track point; and a touch area of the touch track point.

11. The method according to claim 1, wherein when each of the plurality of track points is circular, the size of the track point is a radius of the track point.

12. The method according to claim 1, further comprising: subsequent to acquiring the parameter information of the touch track point, storing the parameter information of the touch track point in a buffer area;

wherein the determining a position parameter, a size and a transparency of each of a plurality of track points to be displayed respectively, based on the touch position parameter and sensing parameter of the each touch track point and those of a predetermined number of touch track points of the plurality of touch track points comprises: determining the position parameter, the size and the transparency of each of the plurality of track points respectively based on the touch position parameter and the sensing parameter of the touch track point and those of the predetermined number of touch track points stored in the buffer area; and wherein the method further comprises: deleting the parameter information of the touch track point from the buffer area subsequent to determining the position parameter, the size and the transparency of each of the plurality of track points to be displayed respectively.

13. An electronic apparatus, comprising:

a display unit configured to receive a touch event;

at least one processor configured to perform the method according to claim 1 in response to the touch event, so that the display unit displays the display canvas.

14. An electronic apparatus, comprising:

a memory configured to store instructions; and at least one processor configured to execute the instructions stored in the memory to perform the method according to claim 1.

15. A non-transitory computer-readable storage medium having computer instructions stored thereon, wherein the computer instructions, when executed by a processor, perform the method according to claim 1.

* * * * *